United States Patent
DiCristina et al.

(10) Patent No.: US 7,159,779 B2
(45) Date of Patent: Jan. 9, 2007

(54) SYSTEM AND METHOD FOR SCANNING BARCODES WITH MULTIPLE BARCODE READERS

(75) Inventors: Joseph A. DiCristina, Bethel, CT (US); John Kline, Danbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 194 days.

(21) Appl. No.: 10/977,842

(22) Filed: Oct. 29, 2004

(65) Prior Publication Data

US 2006/0091218 A1  May 4, 2006

(51) Int. Cl.
*G06K 7/10* (2006.01)
(52) U.S. Cl. .............................. 235/462.14; 235/462.01
(58) Field of Classification Search ..............................
235/462.01–462.47, 472.01, 472.02, 472.03, 235/454, 455, 470, 494, 375
See application file for complete search history.

(56) References Cited

U.S. PATENT DOCUMENTS

| | | | |
|---|---|---|---|
| 4,080,528 A * | 3/1978 | Kao et al. .................... 235/449 |
| 6,034,379 A * | 3/2000 | Bunte et al. ................. 250/566 |
| 6,431,450 B1 * | 8/2002 | Lundahl et al. ......... 235/462.43 |
| 6,457,642 B1 * | 10/2002 | Good et al. ............. 235/462.01 |
| 2002/0179716 A1 * | 12/2002 | Good et al. ............. 235/462.14 |
| 2003/0085281 A1 * | 5/2003 | Knowles et al. ............. 235/454 |
| 2003/0085284 A1 * | 5/2003 | Bremer et al. ......... 235/462.32 |
| 2004/0026503 A1 * | 2/2004 | Gantz ......................... 235/383 |
| 2004/0069854 A1 * | 4/2004 | Good et al. ............. 235/462.14 |
| 2004/0113791 A1 * | 6/2004 | Salim et al. .............. 340/572.3 |
| 2005/0001035 A1 * | 1/2005 | Hawley et al. ......... 235/462.21 |
| 2005/0056699 A1 * | 3/2005 | Meier et al. ................. 235/454 |
| 2006/0102726 A1 * | 5/2006 | Good et al. ............. 235/462.14 |

* cited by examiner

*Primary Examiner*—Thien M. Le
(74) *Attorney, Agent, or Firm*—Michael J. Cummings; Steven J. Shapiro; Angelo N. Chaclas

(57) ABSTRACT

A barcode scanning apparatus and method for reading barcodes on serially fed sheets having barcodes in a consistent location. A transport moves the barcode bearing sheets as they pass below at least two fixed barcode scanners. Both of a first and second barcode scanners scan the barcodes and transmit corresponding signals to an apparatus controller. Preferably the at least two barcode scanners are in series, one closely located immediately downstream of the other. The controller receives the signals from the first and second barcode scanners, and interprets them accordance with a predetermined algorithm. The predetermined algorithm is a function of both the first and second barcode signals and is selectable to provide different levels of reliability checking.

15 Claims, 6 Drawing Sheets

SYSTEM AND METHOD FOR SCANNING BARCODES WITH MULTIPLE BARCODE READERS

TECHNICAL FIELD

The present invention relates an apparatus and method for scanning barcodes on objects to be processed in an automated system, and in particular for a system used to process documents into finished mail pieces.

BACKGROUND OF THE INVENTION

Inserter systems, such as those applicable for use with the present invention, are typically used by organizations such as banks, insurance companies and utility companies for producing a large volume of specific mailings where the contents of each mail item are directed to a particular addressee. Also, other organizations, such as direct mailers, use inserts for producing a large volume of generic mailings where the contents of each mail item are substantially identical for each addressee. Examples of such inserter systems are the 8 series, 9 series, and APS™ inserter systems available from Pitney Bowes Inc. of Stamford Conn.

In many respects, the typical inserter system resembles a manufacturing assembly line. Sheets and other raw materials (other sheets, enclosures, and envelopes) enter the inserter system as inputs. Then, a variety of modules or workstations in the inserter system work cooperatively to process the sheets until a finished mail piece is produced. The exact configuration of each inserter system depends upon the needs of each particular customer or installation.

Typically, inserter systems prepare mail pieces by gathering collations of documents on a conveyor. The collations are then transported on the conveyor to an insertion station where they are automatically stuffed into envelopes. After being stuffed with the collations, the envelopes are removed from the insertion station for further processing. Such further processing may include automated closing and sealing the envelope flap, weighing the envelope, applying postage to the envelope, and finally sorting and stacking the envelopes.

Throughout the inserter system, documents are tracked, and automated processes are controlled, by scanning markings on the document sheets. The optical markings may be a series of dashes, or more sophisticated barcodes. As is known in the art, information contained in markings may include, but is not limited to, information identifying which mailpiece a sheet belongs to, how many sheets are in a mailpiece, what folds are to be made to the sheets, what inserts are to be included with the sheets, the weight of the mailpiece, and information about postage to be placed on the mailpiece. In a more sophisticated inserter system, a barcode may include a pointer to an electronically stored file that will include extensive information about the mailpiece and its processing, beyond what can be stored in the barcode itself. Optical scanning devices positioned group of sheets has reached a given location. Those same scanners can also read information from the sheet to initiate the appropriate processing on the sheet, or set of sheets, within the various modules.

The input stages of a typical inserter system are depicted in FIG. 1. At the input end of the inserter system, rolls or stacks of continuous printed documents, called a "web," are fed into the inserter system by a web feeder 100. The continuous web must be separated into individual document pages. This separation can be carried out by a web cutter 200 that cuts the continuous web into individual document pages. As an alternative to cutting a web, it is known to provide pre-cut sheets to the inserter system input. As the individual pages are created, a barcode on the pages is typically scanned for tracking their entry into the inserter system. Depending on the mail run specifications, the cutter 200 can be set to cut sheets of different sizes. For example, some mailings may require letter size sheets, while others might include legal sized pages, or smaller than letter sized pages. Downstream of the web cutter 200, a right angle turn 300 may be used to reorient the documents, and/or to meet the inserter user's floor space requirements.

The cut pages must subsequently be accumulated into collations corresponding to the multi-page documents to be included in individual mail pieces. This gathering of related document pages occurs in the accumulator module 400 where individual pages are stacked on top of one another.

At the accumulator 400, scanners sense markings on the individual pages to determine what pages are to be collated together in the accumulator module 400. In a typical inserter application, mail pieces may include varying number of pages to be accumulated. When a document accumulation is complete, then the accumulation is discharged as a unit from the accumulator 400. An accumulator module 400 should also be adjustable so that it is capable of handling sheet accumulations of different sizes.

Downstream of the accumulator 400, a folder 500 typically folds the accumulation of documents to fit in the desired envelopes. To allow the same inserter system to be used with different sized mailings, the folder 500 can typically be adjusted to make different sized folds on different sized paper. As a result, an inserter system must be capable of handling different lengths of accumulated and folded documents.

Downstream of the folder 500, a buffer transport 600 transports and stores accumulated and folded documents in series in preparation for transferring the documents to the synchronous inserter chassis 700. By lining up a backlog of documents in the buffer 600, the asynchronous nature of the upstream accumulator 400 will have less impact on the synchronous inserter chassis 700.

On the inserter chassis 700 inserts are added to the folded accumulation prior to insertion into an envelope at a later module. Based on markings scanned from the accumulations, insert feeders are controlled to feed the appropriate inserts (for example advertisements, or special offers) to a particular mailpiece as they travel on the inserter chassis.

Thus it should be apparent that for accurate processing of documents, that it is important to accurately scan and read the markings on the documents. A known solution is to use a fixed beam scanner positioned to read barcodes as they are transported over it. If a fixed beam scanner is unable to read the barcode, because of poor barcode quality, or some other reason, the document cannot be correctly processed, and typically must be outsorted.

SUMMARY OF THE INVENTION

The present invention seeks to increase accuracy for reading of barcodes, so that reliability is enhanced while outsorting and reprocessing of mailpieces is minimized in an inserter system. It has been found that a single fixed beam scanner works adequately when good quality barcodes are printed on the documents being processed. However, it is sometimes the case that poor quality barcodes are printed on the forms to be processed. With poor quality barcodes and high inserter speeds, a single fixed beam scanner arrangement may be insufficient for reliable processing.

One solution, not part of the present invention, could be to use a more expensive moving beam scanner in place of a fixed beam version. Moving beam scanners operate by moving a beam repeatedly across a barcode, and are known to be better at reading poor quality barcodes. However, in addition to being more expensive, moving beam scanners are much larger in size and can be difficult to correctly position without interfering with other mechanisms.

Accordingly, the present invention provides a barcode scanning apparatus that is less expensive and cumbersome than one having a moving beam scanner, and that more accurately reads barcodes than a single fixed beam scanner. In the preferred embodiment, the apparatus reads barcodes on serially fed sheets having barcodes in a consistent location. A transport moves the barcode bearing sheets below at least two fixed barcode scanners. Both a first and second barcode scanners scan the barcodes and transmit corresponding signals to an apparatus controller. Preferably, at least two barcode scanners are in series, with one located immediately downstream of the other.

The controller receives the signals from the first and second barcode scanners, and interprets them accordance with a predetermined algorithm. The predetermined algorithm is a function of both the first and second barcode signals, and is selectable to provide different levels of reliability checking. In this application, it should be understood that the term "signal" may include transducer signals from the sensors, or decoded data from the transducer signals, or both.

At a first level of reliability checking, the controller checks whether a first of the scanners has received a readable signal. If the signal is readable, then the controller controls processing of the document in accordance with the information scanned from the barcode. If the first signal is not readable, then the second scanner signal is checked to see if it is readable for that barcode. If the second signal is readable, then that signal is used for controlling the processing of the document. If neither signal is readable, then an error signal is generated, and corrective action is typically taken, such as outsorting the document from the production process.

A second level of reliability checking provides match comparison when available from the at least two fixed scanners. If both signals are readable, then a comparison is done between them. If there is not a match between the readable barcodes, then it is known that there has been a reading error from one of the scanners. Upon occurrence of such a mismatch, an error signal would be generated. If the signals match, then the documents is processed in accordance with the matched signals.

In the second level of checking, if only one of the barcode scanner signals was readable, then no matching is possible. Under this level of reliability, no matching is required, and processing proceeds using the single signal that was found to be readable.

Under the third level of reliability checking it is required that both barcode scanner signals be readable and that they both match. If either condition is not met under the third level of reliability, then an error signal is generated.

Further details of the present invention are provided in the accompanying drawings, detailed description and claims.

DETAILED DESCRIPTION

Figure 1:
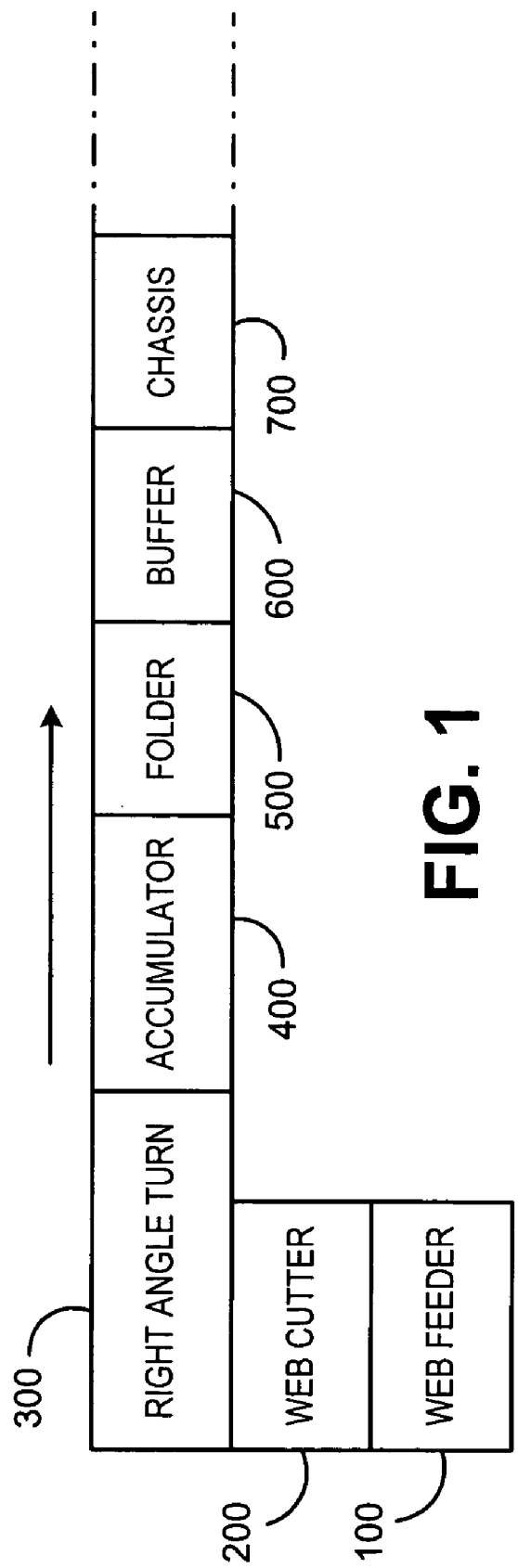
FIG. 1 is a diagram of the input stages of an inserter system for use with the present invention.
Figure 2:
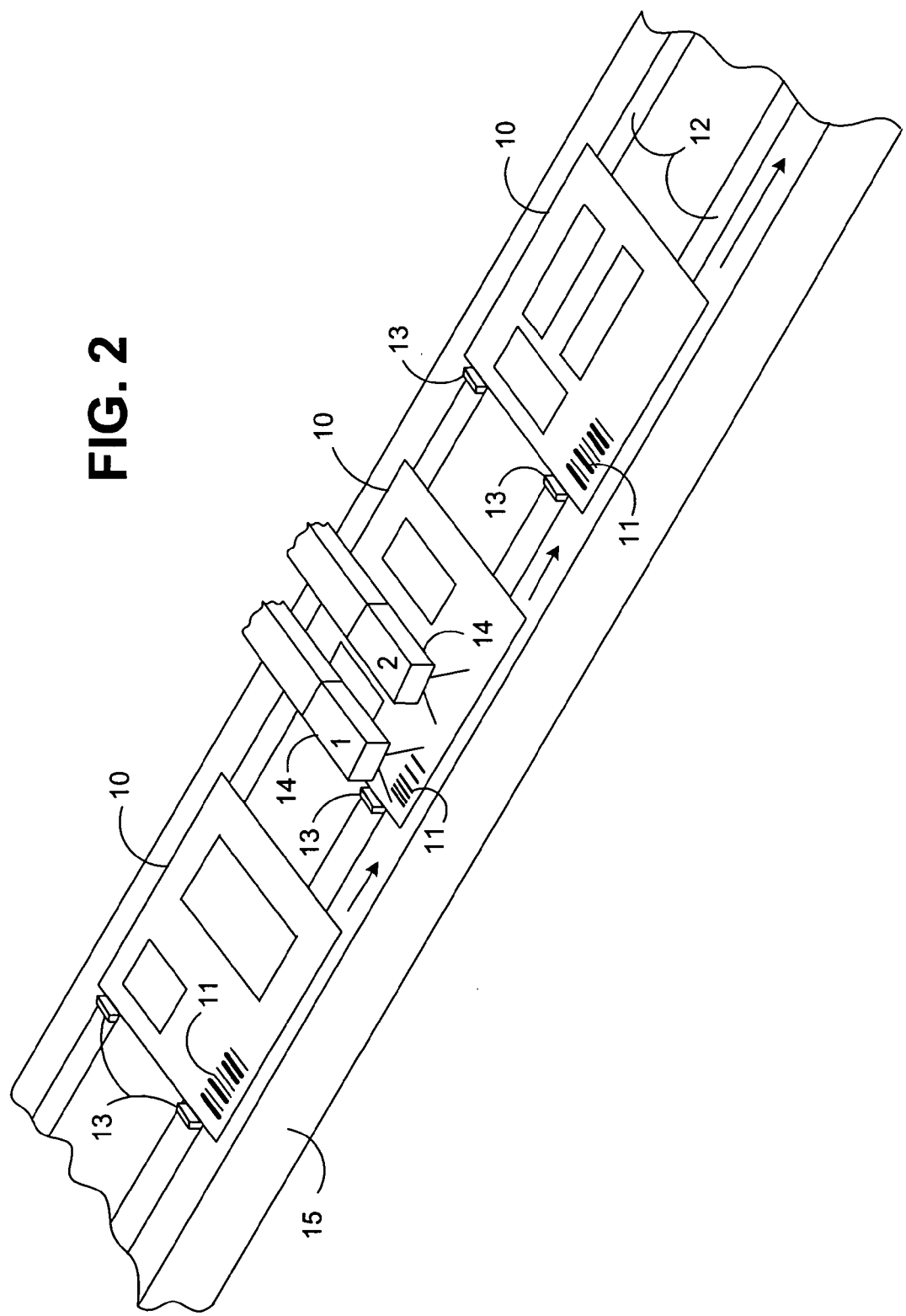
FIG. 2 depicts an isometric view of an improved inserter chassis utilizing a preferred embodiment.

In FIG. 2, a preferred embodiment for implementing the invention on an inserter system is depicted. Fixed barcode scanners 1 and 2 are positioned above a conveyor transport 15 on which documents 10 are transported. Pusher fingers 13 are driven by rotary belts (not shown) to drive sheets 10 in a downstream direction. Fingers 13 extend through slots 12 of transport arrangement 15 while sheets 10 are supported on a deck of the transport 15.

Fixed barcode scanners 1 and 2 are preferably comprised of LED scanners 14 that are compact and easily positioned over the transport 15. Scanners 14 may be any suitable scanning device, and may include scanners using infrared, or other portions of the optical spectrum. For the preferred embodiment, suitable scanners 14 can be obtained from DataLogic, Inc. of Hebron, Ky., or Optek Technologies Inc. of Carrollton, Tex. The scanning portions of fixed scanners 1 and 2 are positioned such that barcodes 11 on documents 10 pass below them for each document. The positions of barcodes 11 on the documents are predetermined so that the correct positioning of the scanners 1 and 2 is known in advance.

Figure 3:
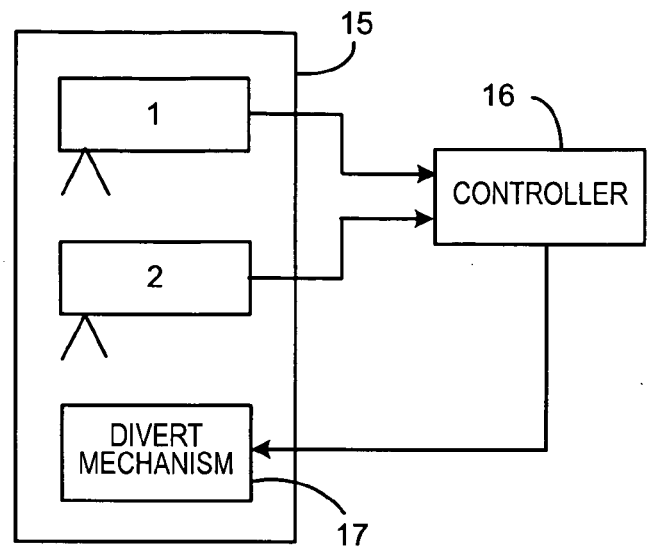
FIG. 3 is a block diagram of a preferred embodiment of an inserter system using the barcode scanning apparatus and method.

As seen in FIG. 3, fixed barcode scanners 1 and 2 are in communication with a controller 16 that controls processing of documents in the inserter system. As seen in FIG. 3, controller 16 controls, for example, a divert mechanism 17 for removing documents from the transport path of the inserter transport 15. The diverter mechanism 17 is activated by controller 16, for example, when scan data from fixed scanners 1 and 2 indicate that an error may have occurred.

It will be understood by one of ordinary skill in the art that scanners 1 and 2 include transducers that generate an electrical signal based on the presense or absence of a mark on the surface being scanned. This raw transducer information is then decoded for the applicable barcode type or font, and meaningful data is derived. For purposes of this application, it is not material whether the decoding process is carried out at the scanners 1 and 2, or at the controller 16. Herein, the term "signal" shall refer to the either of the raw transducer signal, or the decoded data, or both.

Figure 4:
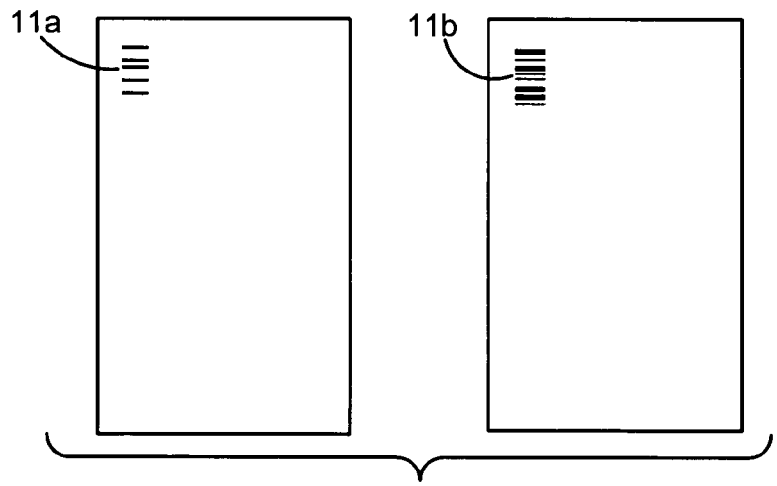
FIG. 4 depicts exemplary barcodes on documents.

FIG. 4 illustrates two types of barcodes that are typically used in connection with processing of mailpieces on an inserter. Barcode 11a depicts an optical mark recognition (OMR) code. As is known in the art, the presence or absence of a line at a given location in the OMR mark has a predetermined meaning. For example, a bar at a certain location within the OMR mark may mean that a particular insert should be added to the mailpiece collation. The absence of that same OMR mark could mean that the particular insert should not be fed onto the collation. Barcode 11b is depicted as a more sophisticated kind of barcode having bars and spaces of varying thicknesses, and that is capable of containing more than the binary information in the OMR marks 11a. Exemplary known barcodes of this type are Code 39, Code 128, interleaved 2 of 5, and UPC/EAN codes.

Figure 5:
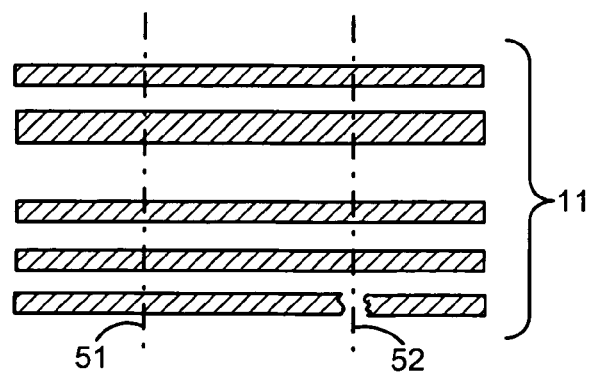
FIG. 5 depicts an exemplary defective barcode.

FIG. 5 depicts a flawed barcode 11 that includes a break along scan line 52. Poor print quality would typically be the cause of the unwanted break, and could result in an inability of the apparatus to interpret the data in the barcode. As depicted in FIG. 2, the preferred embodiment utilizes fixed barcode scanners 1 and 2 arranged in series along the transport path of the documents. In an alternative embodiment, the barcode scanners 1 and 2 could be arranged side-by-side, so that, for example, scanner 1 could scan along line 51 and receive a good sensor reading, while scanner 2 could scan along line 52, and receive the potentially defective sensor reading. In another alternative embodiment, the scanners 1 and 2 can be positioned diagonally from each other, whereby they are set apart in both the transport direction, and laterally to the transport direction.

Figure 6:
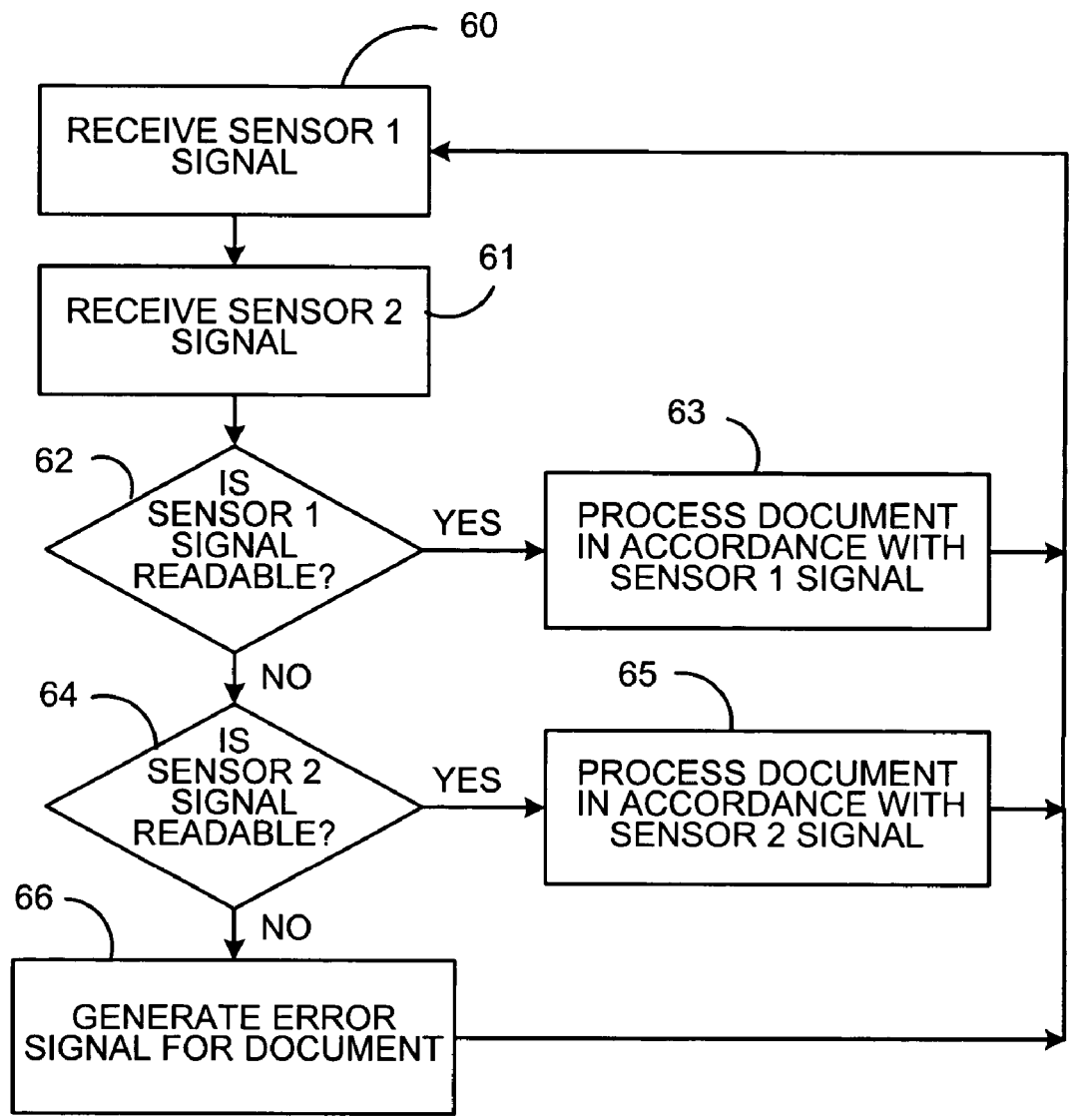
FIG. 6 depicts a flow diagram of a first preferred embodiment for processing of scan information.
Figure 7:
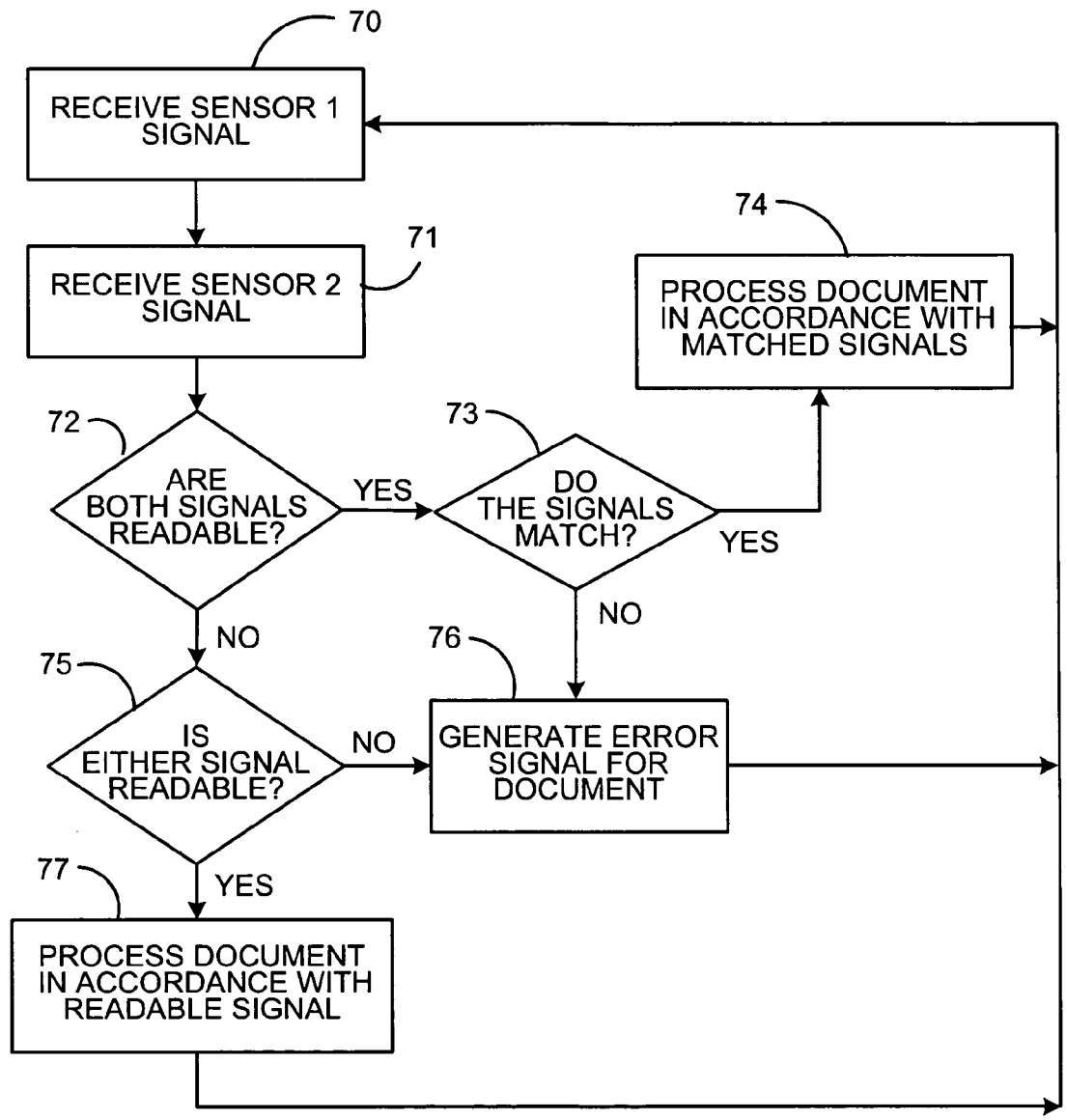
FIG. 7 depicts a flow diagram of a second preferred embodiment for processing of scan information.
Figure 8:
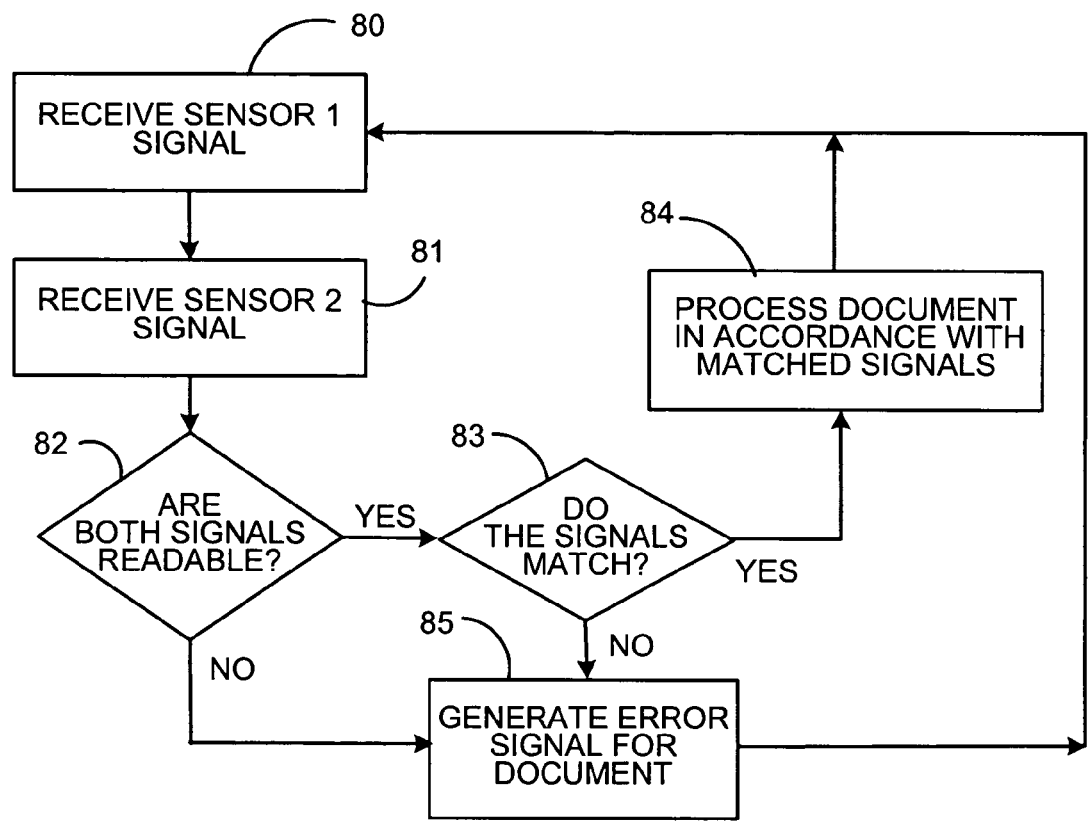
FIG. 8 depicts a flow diagram of a third preferred embodiment for processing of scan information.

FIGS. 6–8 depict flow diagrams for processing of signals from sensors 1 and 2 for providing enhanced reliability in the controller 16 for interpreting data and controlling document processing. Of the three figures, the process of FIG. 6 provides the least level of enhanced reliability from using the two fixed barcode scanners 1 and 2, while FIGS. 7 and 8 depict increasingly enhanced reliability.

As seen in FIG. 6 sensor signals 1 and 2 are received in steps 60 and 61. At step 62, the controller 16 determines if the sensor 1 signal is readable. If the sensor 1 signal is readable, then at step 63 the controller directs processing of the document in accordance with information derived from the sensor 1 signal. Once the document has been processed, then sensor signals are received once again at steps 60 and 61 for the next document to be processed.

If the sensor signal 1 was not readable at step 62, then at step 64, the controller determines whether sensor signal 2 is readable. If so, then at step 65, the controller runs the apparatus to process the document in accordance with the sensor 2 signal. If neither signal 1 nor signal 2 is readable, then at step 66 the controller 16 generates an error signal. In the preferred embodiment, the error signal can result in activation of a diverter 17 to remove the problematic document from the transport 15 path. In an alternative embodiment, an error signal may result in a shut-down of the inserter system, or a secondary scanning system may be activated to perform further scanning operations. It will be understood by those skilled in the art that the error signal can be used to trigger any kind of response in the inserter system, and that the embodiments described above are exemplary in nature.

To achieve a higher level of reliability of scanned information, the process of FIG. 7 provides for checking for matching between sensor signals 1 and 2, when both are available. Sensor signals 1 and 2 are received in steps 70 and 71. At step 72, the controller 16 determines if both the sensor signals 1 and 2 are readable. At step 73, if both signals are readable, then the controller 16 determines if the sensor signals 1 and 2 match. If there is a match then at step 74, the controller 16 controls processing of the document in accordance with the matched signals. If the signals did not match, then at step 76 an error signal is generated.

Returning to step 72, if both signals were not readable, then a determination is made at step 75 whether either signal is readable. If neither signal is readable, then an error signal is once again generated at step 76. If one of the signals is readable, then at step 77 the document is processed in accordance with the readable signal.

Finally, FIG. 8 depicts the highest level of reliability of the three examples shown in the figures. Sensor signals 1 and 2 are received in steps 80 and 81. At step 82, the controller 16 determines if both the sensor signals 1 and 2 are readable. If either or both signals are not readable, then an error signal is generated at step 85. At step 83, if both signals were readable, then the controller 16 determines if the sensor signals 1 and 2 match. If there is a match at step 83, then at step 84, the controller 16 controls processing of the document in accordance with the matched signals. If the signals did not match, then at step 85 an error signal is generated.

Although the invention has been described with respect to preferred embodiments thereof, it will be understood by those skilled in the art that the foregoing and various other changes, omissions and deviations in the form and detail thereof may be made without departing from the spirit and scope of this invention.

What is claimed is:

1. A barcode scanning apparatus for reading barcodes on serially fed objects, the objects having barcodes in a consistent location on the objects, the apparatus comprising:

a transport for moving barcode bearing objects through the apparatus in a predetermined path;

a first fixed barcode scanner located contiguous to a path of travel of the barcodes on the objects transported in the predetermined path, the first fixed barcode scanner generating a first barcode signal based on barcodes scanned as they pass by the first fixed barcode scanner;

a second fixed barcode scanner located contiguous to the path of travel of the barcodes on the objects transported in the predetermined path, the second fixed barcode scanner generating a second barcode signal based on barcodes scanned as they pass by the second fixed barcode scanner; and a controller receiving the first and second barcode signals, the controller interpreting the scanned barcodes in accordance with a predetermined algorithm that is a function of both the first and second barcode signals;

wherein the controller further generates a control signal for use in automated processing of the objects based on the interpreted first and second barcode signals;

wherein the objects are documents and the control signal controls automated processing of the documents;

wherein the predetermined algorithm used by the controller comprises:

determining whether one of the first or second barcode signals is readable;

if the one of the first or second barcode signals is readable, then generating the control signal to control automated processing of the documents in accordance with information in the one of the first or second barcode signals;

if the one of the first or second barcode signal is not readable, determining whether the other of the first or second barcode signals is readable;

if the other of the first or second barcode signals is readable, then generating the control signal to control automated processing of the documents in accordance with information in the other of the first or second barcode signals; and if neither of the first or second barcode signals is readable, then the controller generates an error signal.

2. The barcode scanning apparatus of claim 1 wherein the second barcode fixed barcode scanner is positioned immediately downstream of the first fixed barcode scanner.

3. The barcode scanning apparatus of claim 1 wherein the error signal comprises a diverter activating signal to cause the scanned document to be diverted from the transport.

4. A barcode scanning apparatus for reading barcodes on serially fed objects, the objects having barcodes in a consistent location on the objects, the apparatus comprising:
- a transport for moving barcode bearing objects through the apparatus in a predetermined path;
- a first fixed barcode scanner located contiguous to a path of travel of the barcodes on the objects transported in the predetermined path, the first fixed barcode scanner generating a first barcode signal based on barcodes scanned as they pass by the first fixed barcode scanner;
- a second fixed barcode scanner located contiguous to the path of travel of the barcodes on the objects transported in the predetermined path, the second fixed barcode scanner generating a second barcode signal based on barcodes scanned as they pass by the second fixed barcode scanner;
- a controller receiving the first and second barcode signals, the controller interpreting the scanned barcodes in accordance with a predetermined algorithm that is a function of both the first and second barcode signals;
- wherein the controller further generates a control signal for use in automated processing of the objects based on the interpreted first and second barcode signals;
- wherein the objects are documents and the control signal controls automated processing of the documents;
- wherein the predetermined algorithm used by the controller comprises:
- determining whether both of the first or second barcode signals are readable;
- if the both of the first and second barcode signals are readable, then determining whether the first and second barcode signals match, and if the first and second barcodes match, then generating the control signal to control automated processing of the documents in accordance with the information of the matched first and second readable signals, if the first and second readable signals do not match, then generating an error signal;
- if both the first and second barcode signals are not readable, then determining whether one of the first or second barcode signals is readable, if one of the first or second barcode signals is readable then generating the control signal to control automated processing of the documents in accordance with information in the readable one of the first or second barcode signals; and
- if neither of the first and second barcode signals are readable, then generating the error signal.

5. The barcode scanning apparatus of claim 4 wherein the error signal comprises a diverter activating signal to cause the scanned document to be diverted from the transport.

6. A barcode scanning apparatus for reading barcodes on serially fed objects, the objects having barcodes in a consistent location on the objects, the apparatus comprising:
- a transport for moving barcode bearing objects through the apparatus in a predetermined path;
- a first fixed barcode scanner located contiguous to a path of travel of the barcodes on the objects transported in the predetermined path, the first fixed barcode scanner generating a first barcode signal based on barcodes scanned as they pass by the first fixed barcode scanner;
- a second fixed barcode scanner located contiguous to the path of travel of the barcodes on the objects transported in the predetermined path, the second fixed barcode scanner generating a second barcode signal based on barcodes scanned as they pass by the second fixed barcode scanner;
- a controller receiving the first and second barcode signals, the controller interpreting the scanned barcodes in accordance with a predetermined algorithm that is a function of both the first and second barcode signals;
- wherein the controller further generates a control signal for use in automated processing of the objects based on the interpreted first and second barcode signals;
- wherein the objects are documents and the control signal controls automated processing of the documents;
- wherein the predetermined algorithm used by the controller comprises:
- determining whether both of the first and second barcode signals are readable;
- if the both of the first and second barcode signals are readable, then determining whether the first and second barcode signals match, and if the first and second barcodes match, then generating the control signal to control automated processing of the documents in accordance with the information of the matched first and second signals, if the first and second readable signals do not match, then generating an error signal; and
- if both the first and second barcode signals are not readable, then generating the error signal.

7. The barcode scanning apparatus of claim 6 wherein the error signal comprises a diverter activating signal to cause the scanned document to be diverted from the transport.

8. A barcode scanning apparatus for reading barcodes on serially fed objects, the objects having barcodes in a consistent location on the objects, the apparatus comprising:
- a transport for moving barcode bearing objects through the apparatus in a predetermined path;
- a first fixed barcode scanner located contiguous to a path of travel of the barcodes on the objects transported in the predetermined path, the first fixed barcode scanner generating a first barcode signal based on barcodes scanned as they pass by the first fixed barcode scanner;
- a second fixed barcode scanner located contiguous to the path of travel of the barcodes on the objects transported in the predetermined path, the second fixed barcode scanner generating a second barcode signal based on barcodes scanned as they pass by the second fixed barcode scanner;
- a controller receiving the first and second barcode signals, the controller interpreting the scanned barcodes in accordance with a predetermined algorithm that is a function of both the first and second barcode signals; and
- wherein the first and second fixed barcode scanners are positioned side-by-side with respect to the predetermined path and are operative to concurrently scan barcodes of objects on the transport.

9. A barcode scanning apparatus for reading barcodes on serially fed objects, the objects having barcodes in a consistent location on the objects, the apparatus comprising:
- a transport for moving barcode bearing objects through the apparatus in a predetermined path;
- a first fixed barcode scanner located contiguous to a path of travel of the barcodes on the objects transported in the predetermined path, the first fixed barcode scanner generating a first barcode signal based on barcodes
scanned as they pass by the first fixed barcode scanner;
a second fixed barcode scanner located contiguous to the
path of travel of the barcodes on the objects transported
in the predetermined path, the second fixed barcode
scanner generating a second barcode signal based on
barcodes scanned as they pass by the second fixed
barcode scanner;
a controller receiving the first and second barcode signals,
the controller interpreting the scanned barcodes in
accordance with a predetermined algorithm that is a
function of both the first and second barcode signals;
and
wherein the first and second fixed barcode scanners are
positioned in a skewed relationship whereby they are
offset in a side-by-side direction with respect to the
predetermined path as well as in an upstream and
downstream direction.

10. A method for reading barcodes on serially fed objects
having barcodes in a consistent location on the objects, the
method comprising:
transporting barcode bearing objects in a predetermined
path;
scanning transported objects at a first location of a path of
travel of the barcodes on the objects transported in the
predetermined path;
generating a first barcode signal based on barcodes
scanned as they pass by the first location;
scanning transported objects at a second location on the
path of travel of the barcodes on the objects transported
in the predetermined path;
generating a second barcode signal based on barcodes
scanned as they pass by the second location, wherein
the second location is positioned immediately downstream of the first location in the predetermined path;
interpreting the scanned barcodes in accordance with a
predetermined algorithm that is a function of both the
first and second barcode signals;
generating a control signal for use in automated processing of the objects based on the interpreted first and
second barcode signals;
wherein the objects are documents and the control signal
controls automated processing of the documents;
wherein the predetermined algorithm comprises steps of:
determining whether one of the first or second barcode
signals is readable;
if the one of the first or second barcode signals is readable,
then generating the control signal to control automated
processing of the documents in accordance with information in the one of the first or second barcode signals;
if the one of the first or second barcode signal is not
readable, determining whether the other of the first or
second barcode signals is readable;
if the other of the first or second barcode signals is
readable, then generating the control signal to control
automated processing of the documents in accordance
with information in the other of the first or second
barcode signals; and
if neither of the first or second barcode signals is readable,
then generating an error signal.

11. The barcode reading method of claim 10 wherein the
error signal comprises a diverter activating signal causing a
step of diverting the scanned document from the predetermined path.

12. A method for reading barcodes on serially fed objects
having barcodes in a consistent location on the objects the
method comprising:
transporting barcode bearing objects in a predetermined
path;
scanning transported objects at a first location of a path of
travel of the barcodes on the objects transported in the
predetermined path;
generating a first barcode signal based on barcodes
scanned as the pass by the first location;
scanning transported objects at a second location on the
path of travel of the barcodes on the objects transported
in the predetermined path;
generating a second barcode signal based on barcodes
scanned as they pass by the second location, wherein
the second location is positioned immediately downstream of the first location in the predetermined path;
interpreting the scanned barcodes in accordance with a
predetermined algorithm that is a function of both the
first and second barcode signals; generating a control
signal for use in automated processing of the objects
based on the interpreted first and second barcode signals;
wherein the objects are documents and the control signal
controls automated processing of the documents;
wherein the predetermined algorithm comprises the steps
of:
determining whether both of the first or second barcode
signals are readable;
if the both of the first and second barcode signals are
readable, then determining whether the first and second
barcode signals match, and if the first and second
barcodes match, then generating the control signal to
control automated processing of the documents in
accordance with the information of the matched first
and second signals, if the first and second readable
signals do not match, then generating an error signal;
if both the first and second barcode signals are not
readable, then determining whether either of the first or
second barcode signals is readable, if either of the first
or second barcode signals is readable then generating
the control signal to control automated processing of
the documents in accordance with information in the
readable one of the first or second barcode signals; and
if neither of the first and second barcode signals are
readable, then generating the error signal.

13. The barcode reading method of claim 12 wherein the
error signal comprises a diverter activating signal causing a
step of diverting the scanned document from the predetermined path.

14. A method for reading barcodes on serially fed objects
having barcodes in a consistent location on the objects, the
method comprising:
transporting barcode bearing objects in a predetermined
path;
scanning transported objects at a first location of a path of
travel of the barcodes on the objects transported in the
predetermined path;
generating a first barcode signal based on barcodes
scanned as they pass by the first location;
scanning transported objects at a second location on the
path of travel of the barcodes on the objects transported
in the predetermined path;
generating a second barcode signal based on barcodes
scanned as they pass by the second location, wherein
the second location is positioned immediately downstream of the first location in the predetermined path;
interpreting the scanned barcodes in accordance with
predetermined algorithm that is a function of both the
first and second barcode signals;

generating a control signal for use in automated processing of the objects based on the interpreted first and second barcode signals;

wherein the objects are documents and the control signal controls automated processing of the documents;

wherein the predetermined algorithm comprises the steps of:

determining whether both of the first and second barcode signals are readable;

if the both of the first and second barcode signals are readable, then determining whether the first and second barcode signals match, and if the first and second barcodes match, then generating the control signal to control automated processing of the documents in accordance with the information of the matched first and second signals, if the first and second readable signals do not match, then generating an error signal; and if both the first and second barcode signals are not readable, then generating the error signal.

15. The barcode reading method of claim 14 wherein the error signal comprises a diverter activating signal causing a step of diverting the scanned document from the predetermined path.

* * * * *